United States Patent
Sajassi et al.

(10) Patent No.: US 9,838,310 B1
(45) Date of Patent: Dec. 5, 2017

(54) MECHANISM FOR OPTIMIZED CUSTOMER MAC ADDRESS FLUSHING IN PBB-EVPN

(71) Applicant: Cisco Technology, Inc., San Jose, CA (US)

(72) Inventors: Ali Sajassi, San Ramon, CA (US); Jose A. Liste, Sunnyvale, CA (US); Patrice Brissette, Kanata (CA); Mei Zhang, Raleigh, NC (US); Vi Vu, Dallas, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 75 days.

(21) Appl. No.: 14/920,727

(22) Filed: Oct. 22, 2015

(51) Int. Cl.
*H04L 12/56* (2006.01)
*H04L 12/721* (2013.01)
*H04L 29/12* (2006.01)

(52) U.S. Cl.
CPC .......... *H04L 45/66* (2013.01); *H04L 61/6022* (2013.01)

(58) Field of Classification Search
CPC ......... H04L 12/26; H04L 12/28; H04L 12/46; H04L 12/56
See application file for complete search history.

(56) References Cited

U.S. PATENT DOCUMENTS

| | | | |
|---|---|---|---|
| 8,170,033 B1 * | 5/2012 | Kothari | H04L 12/4641 370/395.53 |
| 9,397,931 B1 * | 7/2016 | Mohanty | H04L 45/28 |
| 2004/0255022 A1 * | 12/2004 | Menon | H04L 41/06 709/224 |
| 2008/0159155 A1 * | 7/2008 | Bajpay | H04L 12/5601 370/248 |
| 2008/0205404 A1 * | 8/2008 | Wen | H04L 12/4641 370/392 |
| 2012/0020206 A1 * | 1/2012 | Busi | H04L 12/24 370/217 |

* cited by examiner

*Primary Examiner* — Mohamed Kamara
(74) *Attorney, Agent, or Firm* — Polsinelli PC

(57) ABSTRACT

Systems, methods, and computer-readable media for flushing of Customer Media Access Control (C-MAC) addresses in a PBB-EVPN network are disclosed. A first provider edge (PE) device can maintain a plurality of service instances configured on a first interface. The first PE device can detect at least one failed ethernet virtual circuit (EVC) on the first interface and identify at least one service instance from the plurality of service instances that is associated with the at least one failed EVC. The PE device can send, to a second PE device, a C-MAC flush notification message that identifies the at least one service instance and the message can cause the second PE device to remove C-MAC addresses corresponding to the at least one service instance and the B-MAC address for the first interface.

20 Claims, 9 Drawing Sheets

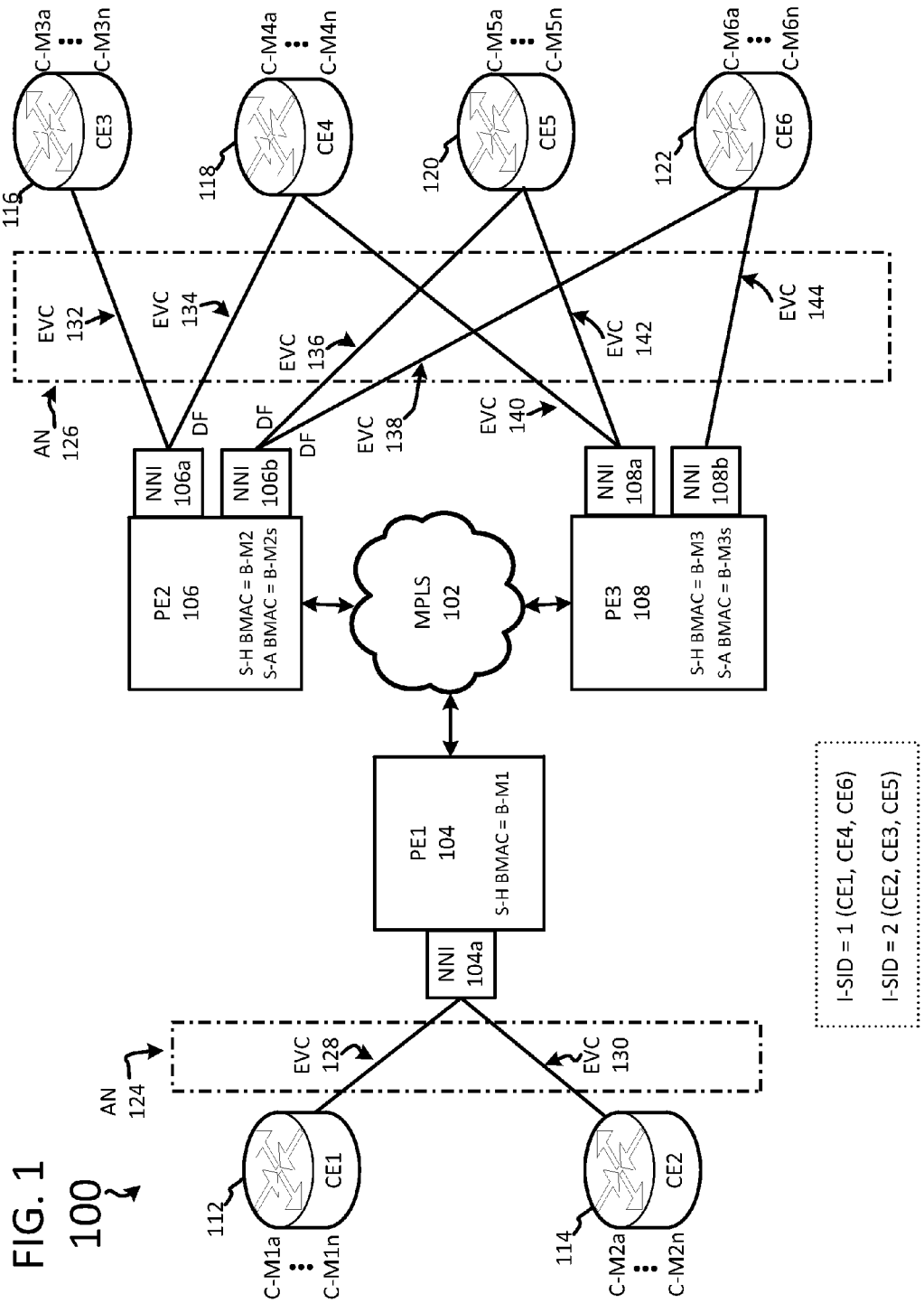

FIG. 2A

PE1 BGP Routing Table

| MAC Route | BGP Next Hop |
|---|---|
| B-M2 | PE2 |
| B-M2s | PE2 |
| B-M3 | PE3 |
| B-M3s | PE3 |

PE1 CMAC Bridging Table I-SID = 1

| CMAC | BMAC |
|---|---|
| C-M1a to C-M1n | n/a (local) |
| C-M4a to C-M4n | B-M2s |
| C-M6a to C-M6n | B-M2s |

PE1 CMAC Bridging Table I-SID = 2

| CMAC | BMAC |
|---|---|
| C-M2a to C-M2n | n/a (local) |
| C-M3a to C-M3n | B-M2 |
| C-M5a to C-M5n | B-M2s |

400 → PE1 BGP Routing Table

| MAC Route | BGP Next Hop |
|---|---|
| B-M2 | PE2 |
| B-M2a | PE2 |
| B-M2b | PE2 |
| B-M3 | PE3 |
| B-M3a | PE3 |
| B-M3b | PE3 |

FIG. 4B

402 → PE1 CMAC Bridging Table I-SID = 1

| CMAC | BMAC |
|---|---|
| C-M1a to C-M1n | n/a (local) |
| C-M4a to C-M4n | B-M2a |
| C-M6a to C-M6n | B-M2b |

FIG. 4C

404 → PE1 CMAC Bridging Table I-SID = 2

| CMAC | BMAC |
|---|---|
| C-M2a to C-M2n | n/a (local) |
| C-M3a to C-M3n | B-M2 |
| C-M5a to C-M5n | B-M2b |

500

700

MECHANISM FOR OPTIMIZED CUSTOMER MAC ADDRESS FLUSHING IN PBB-EVPN

TECHNICAL FIELD

The present technology generally pertains to network based services, and more specifically, to enabling provider edge nodes to perform optimized flushing of a customer media access control address upon detection of a failure in Provider Backbone Bridging-Ethernet VPN (PBB-EVPN) networks.

BACKGROUND

Service provider networks frequently provide multiple connections to a single customer network or customer edge device in order to provide redundancy in the event of a network failure. Unfortunately, a single failure in a link to the customer network or customer edge device can result in the flushing of customer MAC address information that is associated with customers that are unaffected by the failure. Consequently, a single failure can result in a flood of messages among provider edge devices that are forced to re-learn customer MAC information that was unnecessarily flushed. This flood of messages can overextend network resources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates a schematic block diagram of an example service provider network;

FIGS. 2A, 2B, and 2C illustrate a set of example routing and bridging tables;

FIGS. 4A, 4B, and 4C illustrate a second set of example routing and bridging tables;

DESCRIPTION OF EXAMPLE EMBODIMENTS

Figure 3:
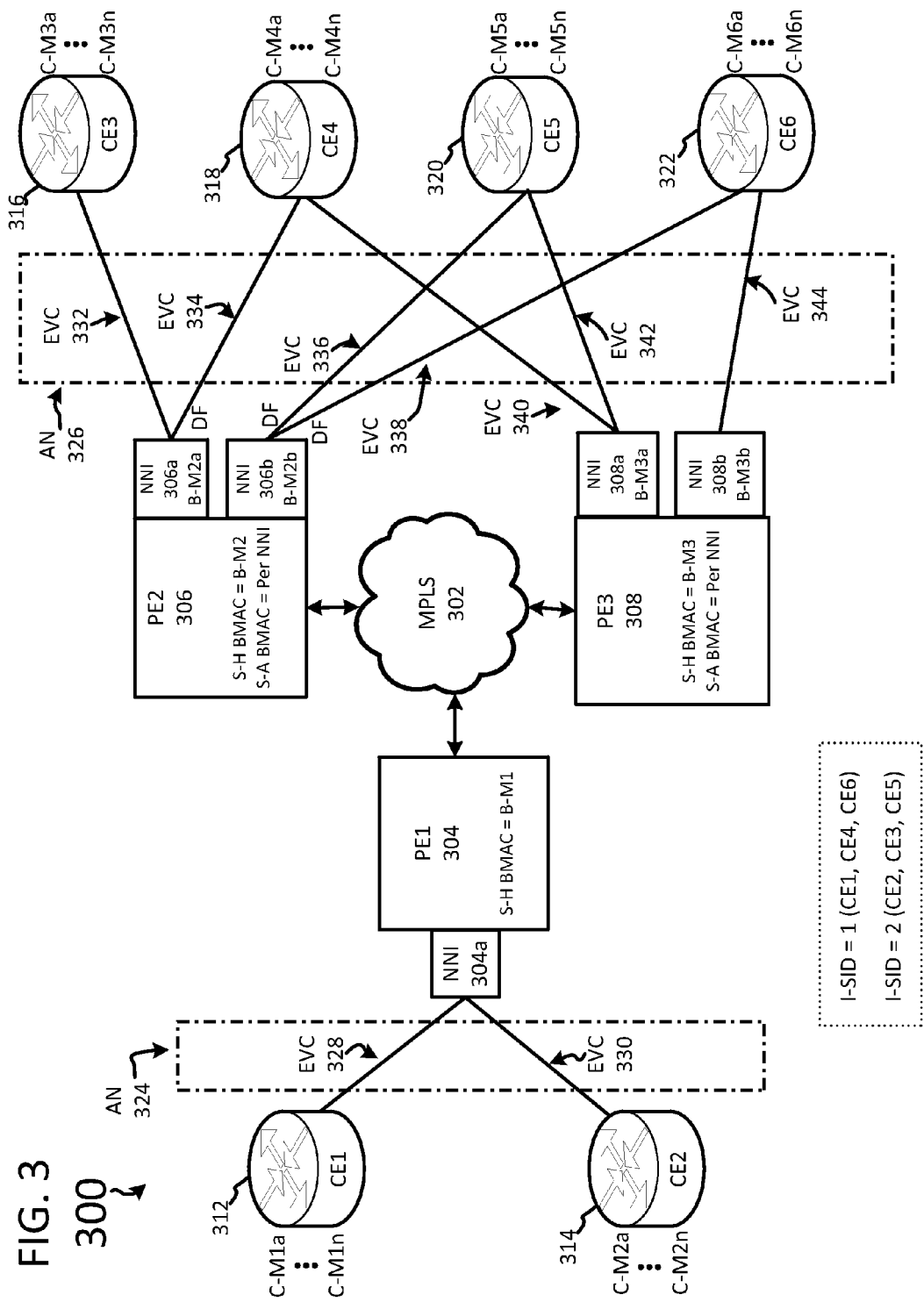
FIG. 3 illustrates a second example of a service provider network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.
Overview:

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The subject technology provides embodiments for performing flushing of customer MAC (C-MAC) addresses in PBB-EVPN. The method includes maintaining, at a first provider edge (PE) device, a plurality of service instances configured on a first interface. The method further includes detecting, at the first PE device, at least one failed ethernet virtual circuit (EVC) on the first interface. The first PE device identifies at least one service instance from the plurality of service instances that is associated with the at least one failed EVC. The first PE device sends, to a second PE device, a message that identifies the at least one service instance. The message causes the second PE device to remove at least one C-MAC address associated with the at least one service instance.

In another aspect of the present technology the method can include receiving, at a PE device from a neighboring PE device, a message that includes at least one service instance and a port identifier. The PE device can identify, based on the at least one service instance identifier and the port identifier, a customer media access control (C-MAC) address corresponding to a customer edge (CE) device and it can remove the C-MAC address from a local route table.

DETAILED DESCRIPTION

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

A service provider network can provide service to customer networks via Provider Edge (PE) devices (e.g. routers or switches) that are located at the edge of the service provider network. Each PE device may be connected directly to a Customer Edge (CE) device (e.g. host, router or switch) located at the edge of a customer network. In other cases, an Access Network (AN) provides connectivity (via Ethernet Virtual Circuits (EVC)) in order to interconnect PE and CE devices. In some instances, the AN can be an Ethernet Access Network (EAN) that can support EVCs by utilizing 802.1Q encapsulations. Alternatively, the AN can be a IP or a MPLS network that can support EVCs by utilizing Ethernet over IP encapsulation or Ethernet over MPLS encapsulation, respectively. The PE devices in a service provider network may be connected by a Multi-Protocol Label Switching (MPLS) infrastructure that provides benefits such as fast-reroute and resiliency. The PE devices may also be connected by an IP infrastructure that utilizes Generic Routing Encapsulation (GRE) tunneling or other IP tunneling between the PE devices.

An Ethernet Virtual Private Network (EVPN) is a layer 2 virtual private network (VPN) technology built over a Packet Switched Network (PSN) (e.g. utilizing an MPLS/IP infrastructure). An EVPN instance includes CE devices that are connected to PE devices that form the edge of the MPLS infrastructure. An EVPN instance can include one or more broadcast domains (e.g. one or more VLANs) that are assigned to a given EVPN instance by the provider of the EVPN service. The PE devices provide virtual layer 2 bridged connectivity between the CE devices. A service provider network can include multiple EVPN instances. EVPN provides advanced multi-homing capabilities and uses Border Gateway Protocol (BGP) to distribute customer MAC address information over the core MPLS network.

Provider Backbone Bridging (PBB) can be combined with EVPN to create a PBB-EVPN. In PBB-EVPN, MAC-in-MAC tunneling is employed to improve service instance and MAC address scalability in Ethernet networks. PBB-EVPN reduces the number of BGP MAC advertisement routes by aggregating Customer MAC (C-MAC) address via Provider Backbone MAC address (B-MAC). PBB-EVPN uses BGP to distribute B-MAC address reachability information over the core MPLS network EVPN and PBB-EVPN can each provide a service provider network with solutions for multipoint Ethernet services utilizing MPLS/IP networks and advanced multi-homing capabilities. For example, EVPN and PBB-EVPN can each support single-homed devices, single-homed networks, multi-homed devices and multi-homed networks. A customer multi-homed device or a customer multi-homed network can tolerate certain network failures because the connection to two or more PE devices provides additional redundancy. In all-active redundancy mode, all of the PEs attached to a customer multi-homed device/network are allowed to forward traffic to/from that customer device or customer network. In single-active redundancy mode, only a single PE (the designated forwarder), among a group of PEs attached to a customer multi-homed device/network, is allowed to forward traffic to/from the customer device or customer network. In the event a failure occurs at the PE device that is the designated forwarder, a new designated forwarder can be elected in order to maintain network connectivity. In addition, for single-active multi-homing, flush notification messages are generated to alert remote PEs of the topology change and to trigger MAC flushing that leads to temporary flooding and will assist in restoring connectivity over the surviving interfaces.

In the case where a CE device/network is multi-homed to two or more PE devices, the set of Ethernet links between the CE device and the PE devices constitutes an Ethernet Segment (ES). In instances when an AN is used, a port (physical or logical (e.g. bundle)) on a PE device acts as a Network-to-Network Interface (NNI). In this context, NNIs are used to aggregate and interconnect customers to a PE device by utilizing access Ethernet Virtual Circuits (EVCs). An External NNI (ENNI) is used when the AN is built and operated by a third-party Service Provider. An Ethernet Segment that consists of EVCs instead of physical links is referred to as a Virtual Ethernet Segment (vES).

The use of Ethernet Virtual Circuits and Virtual Ethernet Segments can significantly expand the capability of a single PE device. In the case of an ES, the PE is limited to having a single CE device connected to each of its ports, i.e. there is a one-to-one relationship between a CE device and a physical/logical port (e.g. a bundle such as a 2×10GE bundle) on the PE. In the case of a vES, the PE device can be configured to provide service to thousands of customers over a common NNI that terminates access EVCs interconnecting thousands of CE devices.

Figure 5:
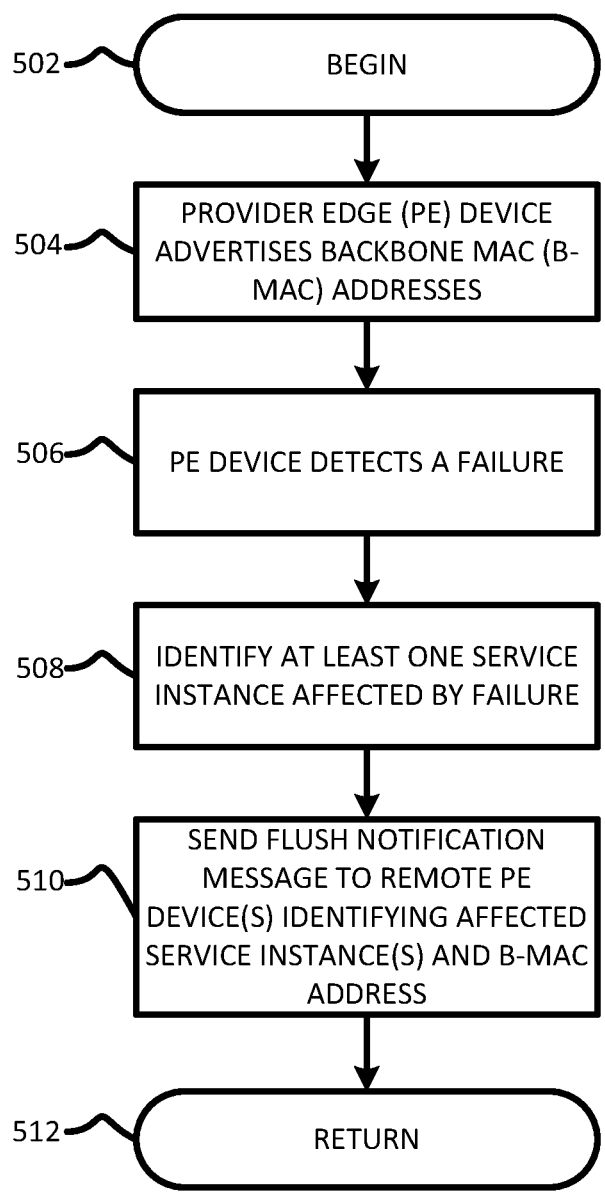
FIG. 5 illustrates an example method for performing customer MAC address flushing.
Figure 6:
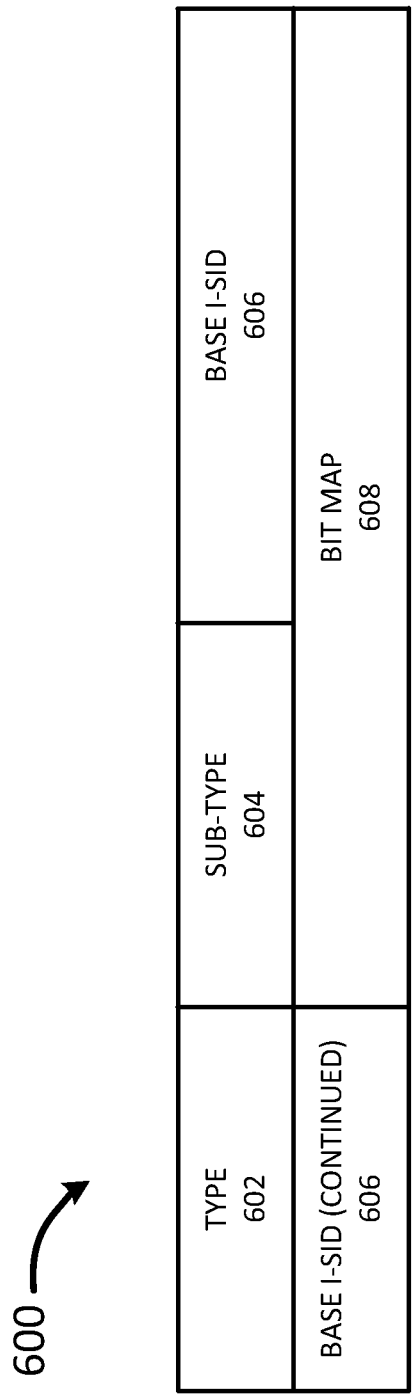
FIG. 6 illustrates an example message for implementing customer MAC flushing.
Figure 7:
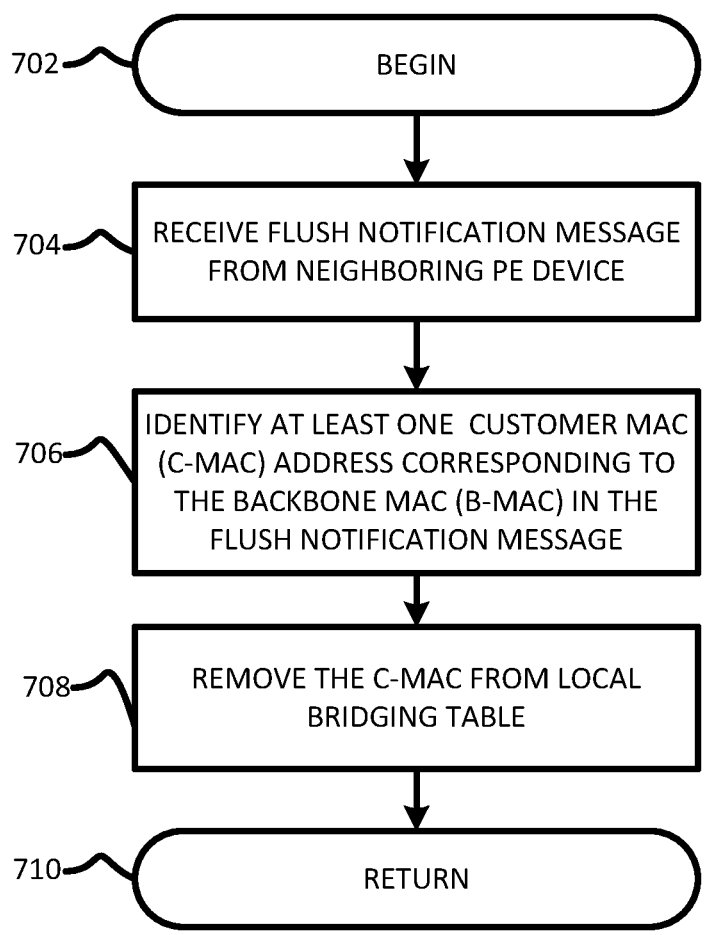
FIG. 7 illustrates a second example method for performing customer MAC flushing.
Figure 8:
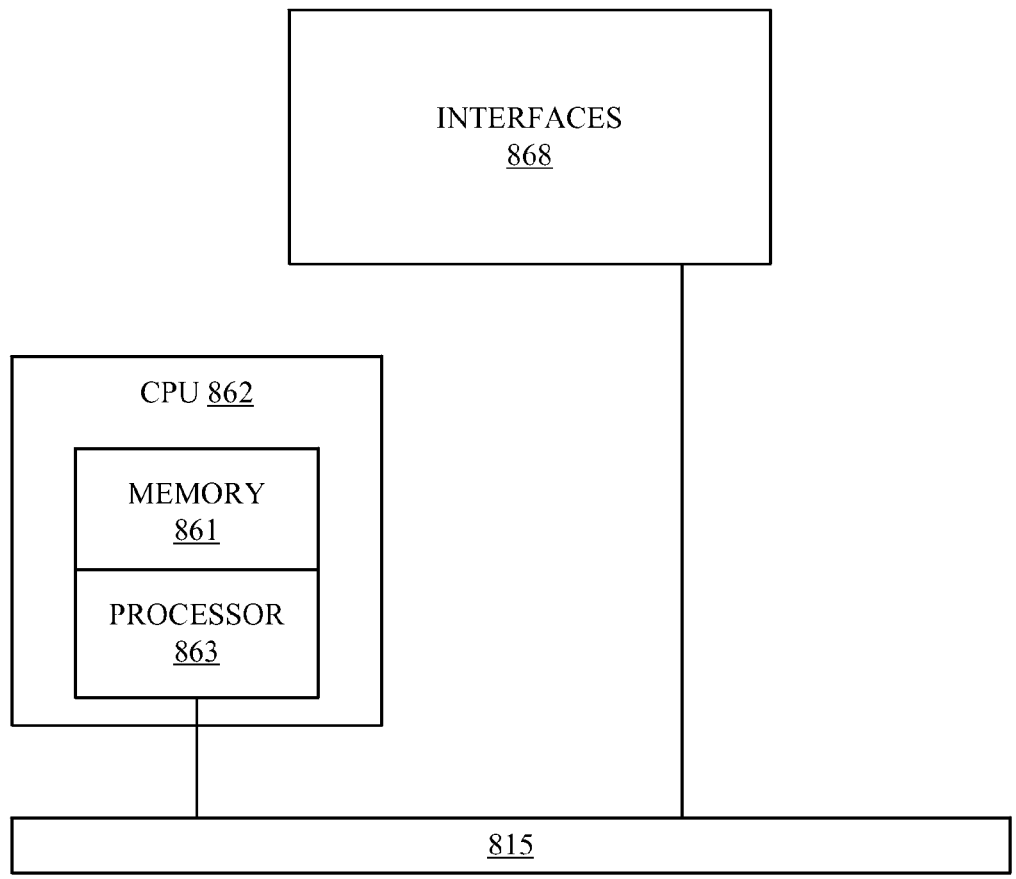
FIG. 8 illustrates an example network device.
Figure 9A:
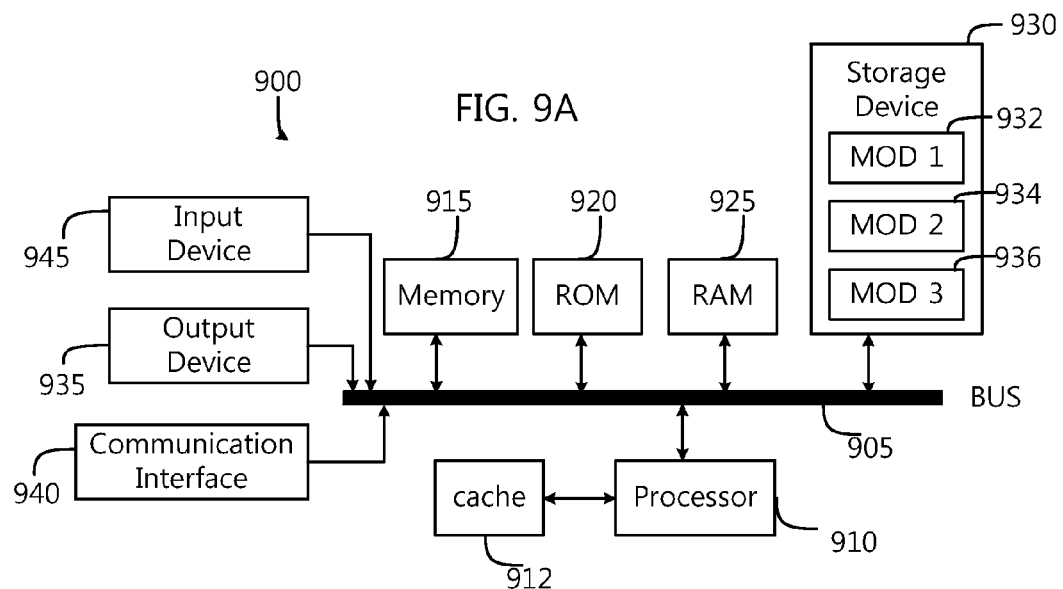
FIGS. 9A and 9B illustrate example system embodiments.
Figure 9B:
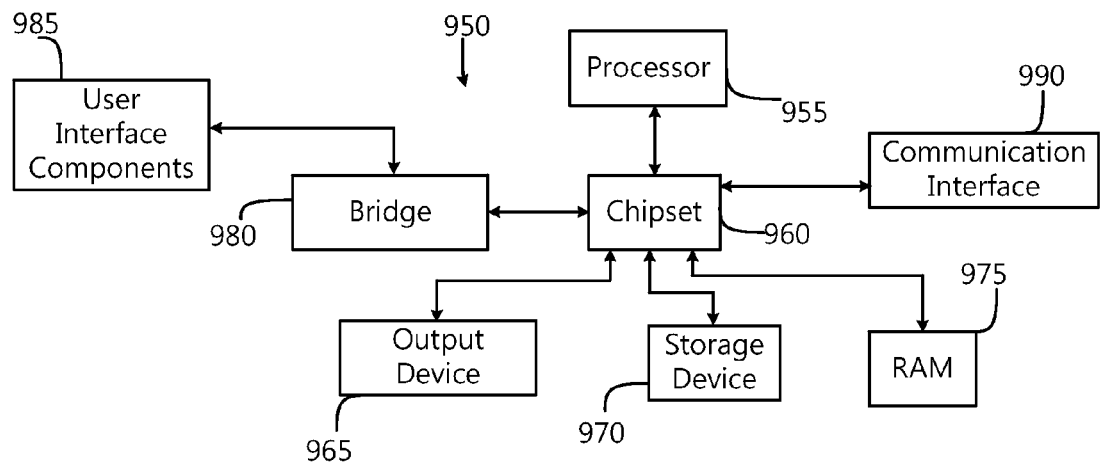

The disclosed technology addresses the need in the art for an improved mechanism to perform customer MAC address (C-MAC) flushing in PBB-EVPN networks for single-active multi-homing scenarios. Disclosed are systems, methods, and computer-readable storage media for performing C-MAC flushing in the event a failure is detected at a PE device. A description of service provider network configurations, as illustrated in FIGS. 1 and 3, are first disclosed herein. A discussion of improved technique for performing C-MAC flushing in PBB-EVPN will then follow, including examples and variations as illustrated in FIGS. 5-7. The discussion concludes with a brief description of example devices, as illustrated in FIGS. 8 and 9A-B. These variations shall be described herein as the various embodiments are set forth. The disclosure now turns to FIG. 1.

FIG. 1 illustrates a schematic block diagram of an example service provider network 100 including nodes/devices interconnected by various methods of communication. The service provider network 100 can include any number of provider edge (PE) devices such as PE1 104, PE2 106, and PE3 108. The PE devices can communicate with each other over a Multi-Protocol Label Switching (MPLS) network 102.

The service provider network 100 can also include any number of Customer Edge (CE) devices such as CE1 112, CE2 114, CE3 116, CE4 118, CE5 120, and CE6 122. A CE device may be a host, a router, or a switch. The PEs can provide virtual Layer 2 bridged connectivity between the CEs. The CE devices can provide network connectivity to any number of customer devices corresponding to various customer MAC (C-MAC) addresses. For example, CE1 112 can be associated with C-MACs C-M1$a$ to C-M1$n$, where 'n' represents any number of C-MAC addresses. Similarly, CE2 114 can be associated with C-MACs C-M2$a$ to C-M2$n$ and CE3, CE4, CE5, and CE6 are also associated with corresponding 'n' number of C-MAC addresses, as illustrated in FIG. 1. The service provider network 100 can include multiple service instances. For example, as illustrated service provider network 100 includes two service instances, I-SID=1 including CE1, CE4, and CE6 and I-SID=2 including CE2, CE3 and CE5.

Service provider network 100 can also include an Access Network (AN) 124 and Access Network (AN) 126 that can provide connectivity between PE devices and CE devices. AN 124 and AN 126 can be an Ethernet Access Network (EAN), a MPLS network, or an IP network. In some instances, PE devices 104-108 and AN 124/126 can be built and/or operated by a single service provider. Alternatively, PE devices 104-108 and AN 124/126 can be built and/or operated by separate entities or by separate divisions associated with a service provider. Those skilled in the art will recognize that AN 124 and AN 126 can include additional network components that are not shown in FIG. 1.

Each PE device in the service provider network 100 can have one or more ports that can be used to provide network connectivity to the CE devices via AN 124/126. A port on a PE device can be a physical port such as a LOGE interface or logical port such as a 2×10GE bundle. For example, PE1 104 can have one or more physical or logical ports such as Network-to-Network Interface (NNI) 104a. Likewise, PE2 106 can have one or more physical or logical ports such as Network-to-Network Interface (NNI) 106a and 106b, and PE3 108 can have a physical/logical ports such as NNI 108a and 108b. When AN 124/126 is operated by a third-party service provider, the ports on PE device 104-108 can correspond to an External NNI (ENNI).

Each NNI on PE devices 104-108 can be associated with one or more Ethernet Virtual Circuits (EVCs) that can be used by AN 124/126 to provide connectivity between PE and CE devices. For example, NNI 104a can be associated with EVC 128 and EVC 130 that provide connectivity to CE 1 112 and CE 2 114, respectively. Similarly, EVC 132 can be configured on NNI 106a to provide connectivity between PE2 106 and CE3 116; EVC 134 can be configured on NNI 106a to provide connectivity between PE2 106 and CE4 118; EVC 136 and EVC 138 can be configured on NNI 106b to provide connectivity between PE2 106 and CE5 120 and CE6 122, respectively; EVC 140 and EVC 142 can be configured on NNI 108a to provide connectivity between PE3 108 and CE4 118 and CE5 120, respectively; and EVC 144 can be configured on NNI 108b to provide connectivity between PE3 108 and CE6 122. In service provider network 100, each EVC serves as the connection between a CE device and its associated PE, which can be referred to as an attachment circuit (AC). An AC can include a point-to-point connection on a physical interface, a PPP session from an L2TP tunnel, an MPLS Label Switched Path (LSP), or a virtual port, and may be any transport technology, e.g., Frame Relay, ATM, a VLAN, etc.

In the case where a CE device/network is multi-homed to two or more PE devices, the set of EVCs between the CE device and the PE devices constitutes a Virtual Ethernet Segment (vES). For example, CE4 118 is multi-homed to PE2 106 and PE3 108 and is associated with a vES that includes EVC 134 and EVC 140. Similarly, a vES exists for CE5 120 (EVC 136 and EVC 142) and CE6 122 (EVC 138 and EVC 144), as both of these devices are also multi-homed. Those skilled in the art will recognize that the number of devices shown and the specific configuration is for the purpose of illustration only and is not intended to limit the scope of the present technology. In some embodiments, a switch can be used to aggregate multiple EVCs into a single physical port on a PE device. For example, EVCs 136, and 138 can each be coupled to a network switch (not shown) that is connected to NNI 106b. The configuration shown in service provider network 100 is for illustrative purposes and does not limit the present technology. Configurations that include additional and/or different components and connections are contemplated herein.

When a CE is multi-homed, i.e. it is connected to more than one PE, there are two redundancy modes of operation. In all-active redundancy mode, all of the PEs attached to a particular vES are allowed to forward traffic to/from that vES. In single-active redundancy mode, only a single PE (the designated forwarder, "DF"), among a group of PEs attached to a vES, is allowed to forward traffic to/from the vES.

Service provider network 100 can include both single-homed and multi-homed CE devices and networks. For example, CE1 112 and CE2 114 are connected to PE1 104 through EVC 128 and EVC 130, respectively. As illustrated, CE1 112 and CE2 114 are not connected to any other PE devices. Thus, CE1 112 and CE2 114 can be classified as single-homed devices. That is, if a failure occurs on PE1 104 that causes NNI 104a to fail or if a failure occurs on a corresponding EVC, then CE1 112 and CE2 114 would be left without network connectivity because there are no other connections to provide redundancy.

Similarly, CE3 116 is also a single-homed device because it is connected to PE2 106 (NNI 106a) via EVC 132 and it is not connected to any other PE devices. Alternatively, CE4 118, CE 5 120, and CE6 122 are each multi-homed devices because they are connected to more than one PE device. For example, CE4 118 is connected to PE2 106 through EVC 134 and also to PE3 108 through EVC 140. Accordingly, PE2 106 and PE3 108 can function together in either all-active redundancy mode or in single-active redundancy mode with respect to CE4 118. With respect to CE5 120, it is connected to PE2 106 through EVC 136 and also to PE3 108 through EVC 142. With respect to CE6 122, it is connected to PE2 106 through EVC 138 and also to PE3 108 through EVC 144. As illustrated, each of the multi-homed CE devices (CE4, CE5, and CE6) are in single-active redundancy mode with PE2 as the designated forwarder, as denoted by the "DF" in FIG. 1. Accordingly, the ports on PE3 that are connected to CE4, CE5, and CE6 can be designated to block traffic.

In some embodiments, service provider network 100 can also include multiple CE devices that are part of a single customer network (not illustrated). A single customer location may increase its redundancy by maintaining multiple CE devices that are each connected to different PE devices. In such an instance, the customer network is said to be a multi-homed network. A multi-homed network can receive the same redundancy benefits as a multi-homed device; e.g. the PE devices can operate in single-active redundancy mode or in all-active redundancy mode.

Service provider network 100 can provide multipoint Ethernet service by utilizing PBB-EVPN. Each PE device in service provider network 100 can be associated with one or more backbone MAC (B-MAC) addresses. Each PE device can use MAC-in-MAC tunneling such that traffic can be a PBB encapsulated message using a B-MAC address corresponding to the PE device or a B-MAC corresponding to a particular port on the PE device. PE devices can signal and learn B-MAC addresses from other PE devices via the control plane using Border Gateway Protocol (BGP). At start-up, each PE device can send an EVPN MAC advertisement route message that informs neighboring PE devices of the B-MACs on each PE device. The neighboring PE devices can use this information to populate a BGP routing table.

In one embodiment, each PE device can be associated with at least two B-MAC addresses. The first B-MAC address can be used by the PE device for traffic that corresponds to single-homed (S-H) CE devices. The second B-MAC address can be used by the PE device for traffic that corresponds to single-active (S-A) multi-homed CE devices. For example, PE2 106 can use 'B-M2' as the B-MAC address for its S-H CE devices (CE3) and it can use 'B-M2s' as the B-MAC address for its S-A multi-homed CE devices (CE4, CE5, CE6). Similarly, PE3 108 can use 'B-M3' as the B-MAC address for its S-H CE devices (none shown) and it can use 'B-M3s' as the B-MAC address for its S-A multi-homed CE devices (CE4, CE5, CE6). With respect to PE1 104, it is not associated with any S-A multi-homed CE devices and therefore only utilizes B-M1 as the B-MAC address for its S-H CE devices (CE1, CE2).

As stated above, each PE device can advertise its B-MAC addresses to neighboring PE devices. This advertisement can be done via the control plane irrespective of any data traffic. Upon receiving the messages advertising B-MAC addresses, each PE device can maintain and update a BGP routing table. FIG. 2A illustrates and example table 200 as maintained by PE1 in service provider network 100. The table includes the two B-MAC addresses advertised by PE2 (B-M2 and B-M2s) and the two B-MAC addresses advertised by PE3 (B-M3 and B-M3s). In some instances, PE devices can advertise the S-H B-MAC address even when they do not have any corresponding S-H CE devices. Accordingly, the table at PE1 can include B-M3 as advertised by PE3 even though PE3 is not associated with any S-H CE devices in service provider network 100.

Each PE device in service provider network 100 can learn customer MAC (C-MAC) addresses via the data plane. When incoming customer traffic is broadcast traffic, multicast traffic, or unknown unicast traffic, a PE device can encapsulate data packets with an appropriate B-MAC as the outer MAC header and then flood the message to all neighboring PE devices. A PE device that receives the message can de-encapsulate it and determine the originating C-MAC address which is associated with the B-MAC address that was imposed as the outer MAC header by the sending PE. The receiving PE device can use this information to maintain one or more C-MAC bridging tables. For example, a PE device can maintain a separate C-MAC bridging table for each service instance (I-SID); e.g., VLAN, customer, broadcast domain. As illustrated, service provider network 100 includes two service instances; I-SID=1 includes CE1, CE4, and CE6 and I=SID 2 includes CE2, CE3, and CE5. Accordingly, each PE device in service provider network 100 can maintain two C-MAC bridging tables.

FIG. 2B illustrates a C-MAC bridging table for I-SID=1 as maintained in PE1. The table includes the C-MAC addresses associated with each of the CEs (CE1, CE4, and CE6) in the service instance. C-M1a to C-M1n are associated with a local port; C-M4a to C-M4n are associated with B-M2s because CE4 is a S-A multi-homed CE device and therefore the PE utilizes the shared S-A B-MAC address; and C-M6a to C-M6n are also associated with B-M2s because CE6 is a S-A multi-homed CE device and therefore the PE utilizes the shared S-A B-MAC address.

FIG. 2C illustrates a C-MAC bridging table for I-SID=2 as maintained in PE1. The table includes the C-MAC addresses associated with each of the CEs (CE2, CE3, and CE5) in service instance I-SID=2. C-M2a to C-M2n are associated with a local port; C-M3a to C-M3n are associated with B-M2 because CE3 is a single-homed CE device and therefore the PE utilizes the S-H B-MAC address; and C-M5a to C-M5n are associated with B-M2s because CE5 is a S-A multi-homed CE device and therefore the PE utilizes the shared S-A B-MAC address. The C-MAC bridging tables maintained by PE1 do not include C-MACs associated to any B-MACs from PE3 because PE3 is blocking while PE2 is the designated forwarder for each of the S-A multi-homed CEs. Accordingly, no data plane learning of C-MACs can take place from PE3 because it is not sending any traffic.

In the event a failure occurs that affects a particular port (e.g. NNI) or an EVC associated with a single-active multi-homed device or network, the PE device can detect the failure and inform neighboring PE devices so that they can flush or remove any affected C-MAC addresses from their respective tables. The PE device can inform the neighboring PE devices of the failure by sending a flush notification message. The flush notification message can include a B-MAC address associated with the failure as well as an indication of the affected service instance.

For example, if PE2 106 detects a failure on EVC 138, it can transmit a flush notification message to neighboring PE devices instructing them to flush/erase all C-MACs that were learned via single-active segments on PE2 for service instance 1 (I-SID=1). Accordingly, PE1 will only flush C-MACs associated with B-MACs on service instance 1, which include C-M4a to C-M4n and C-M6a to C-M6n. By doing so, the neighboring PEs can avoid flushing C-MAC addresses that are not part of the affected service instance. That is, the neighboring PEs will not flush the C-MAC addresses for service instance 2.

In another example, PE2 can detect a port failure on NNI 106b affecting CE5 and CE6, which are part of two different service instances. PE2 can transmit a flush notification to neighboring PE devices that instructs them to flush/erase C-MACs learned on any single-active segment present on PE2 for services instances 1 and 2. In one embodiment, the message can be a re-advertisement of the B-MAC address for S-A multi-homed segments on PE2 which corresponds to B-M2s. Accordingly, PE1 can erase all C-MACs associated with B-MAC B-M2s from the bridging tables for service instance 1 and service instance 2. However, because a distinct B-MAC is used for the S-A multi-homed segments, PE1 does not flush the C-MAC addresses associated with CE3 which is a single-homed device. This results in less flooding because PE1 does not have to re-learn the C-MAC addresses associated with CE3.

FIG. 3 illustrates a schematic block diagram of an example service provider network 300. The topology of service provider network 300 is similar to that of service provider network 100, as described above with respect to FIG. 1. That is, the service provider network includes three PE devices, PE 1 304, PE2 306, and PE3 308 which collectively provide services to CE1 to CE6. The service provider network 300 includes two service instances, I-SID=1 including CE1, CE4, and CE6 and I-SID=2 including CE2, CE3 and CE5.

The PE devices in service provider network 300 can be associated with any number of B-MAC addresses. For example, each PE device can maintain a B-MAC address that is used for its single-homed segments and it can also maintain distinct B-MAC addresses for its single-active multi-homed segments. In one embodiment, the B-MAC addresses for the S-A multi-homed segments can be allocated per each NNI. For example, PE2 306 can allocate B-MAC 'B-M2a' to S-A segments on NNI 306a and it can allocate B-MAC 'B-M2b' to S-A segments on NNI 306b. PE2 306 can also allocate B-MAC 'B-M2' for all single-homed segments, regardless of what NNI port they are coupled to.

As discussed above, each PE device can advertise each of its B-MAC addresses to the neighboring PE devices. The neighboring PE devices can use this information to populate a BGP routing table (e.g. RIB—routing information base). FIG. 4A illustrates an example table 400 as maintained by PE1 304 in service provider network 300. The table includes all of the B-MAC addresses advertised by neighboring PEs PE2 and PE3. For example, the table includes B-M2 (PE2 B-MAC for S-H segments), B-M2a (PE2 B-MAC for S-A segments on NNI 306a), B-M2b (PE2 B-MAC for S-A segments on NNI 306b), B-M3 (PE3 B-MAC for S-H segments), B-M3a (PE3 B-MAC for S-A segments on NNI 308a) and B-M3b (PE3 B-MAC for S-A segments on NNI 308b).

The PE devices can learn C-MAC addresses via the data plane by de-encapsulating MAC-in-MAC messages. FIG. 4B illustrates a C-MAC bridging table for I-SID=1 as maintained in PE1 304. The table includes the C-MAC addresses associated with each of the CEs (CE1, CE4, and CE6) in the service instance. C-M1a to C-M1n are associated with a local port; C-M4a to C-M4n are associated with B-M2a because CE4 is a S-A multi-homed CE device that is coupled to NNI 306a; therefore the PE utilizes the dedicated S-A B-MAC address for the NNI; and C-M6a to C-M6n are associated with B-M 2b because CE6 is a S-A multi-homed CE device that is coupled to NNI 306b; therefore the PE utilizes the dedicated S-A B-MAC address for the NNI.

FIG. 4C illustrates a C-MAC bridging table for I-SID=2 as maintained in PE1. The table includes the C-MAC addresses associated with each of the CEs (CE2, CE3, and CE5) in service instance I-SID=2. C-M2a to C-M2n are associated with a local port; C-M 3a to C-M3n are associated with B-M2 because CE3 is a single-homed CE device and therefore the PE utilizes the S-H B-MAC address; and C-M5a to C-M5n are associated with B-M2b because CE5 is a S-A multi-homed CE device that is coupled to NNI 306b, therefore the PE utilizes the dedicated S-A B-MAC address for the NNI. The C-MAC bridging tables maintained by PE1 do not include C-MACs associated to any B-MACs from PE3 because PE3 is blocking while PE2 is the designated forwarder for each of the S-A multi-homed CEs. Accordingly, no data plane learning of C-MACs can take place from PE3 because it is not sending any traffic.

In the event a failure occurs that affects a particular port (e.g. NNI) or an EVC associated with a single-active multi-homed device or network, the PE device can detect the failure and inform neighboring PE devices so that they can flush or remove any affected C-MAC addresses from their respective tables. The PE device can inform the neighboring PE devices of the failure by sending a flush notification message. The flush notification message can include a B-MAC address associated with the failure as well as an indication of the affected service instance.

For example, if PE2 306 detects a failure on EVC 338, it can transmit a flush notification message to neighboring PE devices instructing them to flush/erase all C-MACs that were learned via NNI 306b on service instance 1 (I-SID=1). Accordingly, PE1 will flush C-MACs associated with B-MAC 'B-M2b' on service instance 1, which include C-M6a to C-M6n. By doing so, the neighboring PEs can avoid flushing C-MAC addresses that are not part of the affected service instance and can also avoid flushing C-MAC addresses that are part of the same service instance but were learned via a different NNI port. That is, the neighboring PEs will not flush the C-MAC addresses for service instance 2 and will not flush the C-MAC addresses for CE4, which are part of the same service instance but were learned via NNI 306a corresponding to B-MAC B-M2a.

In another example, PE2 can detect a port failure on NNI 306b affecting CE5 and CE6, which are part of two different service instances. PE2 can transmit a flush notification to neighboring PE devices that instructs them to flush/erase C-MACs learned on any single-active segment learned through NNI 306b for services instances 1 and 2. Accordingly, PE1 can erase all C-MACs associated with B-MAC B-M2b from the bridging tables for service instance 1 and service instance 2. However, because a distinct B-MAC is used for the S-A multi-homed segments on the affected NNI port, PE1 does not flush the C-MAC addresses associated with CE3 or CE4. This results in less flooding because PE1 does not have to re-learn the C-MAC addresses associated with CE3 or CE4.

FIG. 5 illustrates an example method 500 for performing customer MAC address flushing upon detecting a failure in PBB-EVPN. The method 500 begins at step 502 and proceeds to step 504 where a PE device advertises backbone MAC (B-MAC) addresses via the control plane using BGP messages. The advertised B-MAC addresses can include a B-MAC address for single-homed segments, a B-MAC address that is shared for all single-active multi-homed segments, and/or B-MAC addresses for each NNI port on the PE device that is coupled to a single-active multi-homed segment. The PE device can configure and maintain service instances on its respective NNIs. A service instance can be associated with a particular customer, VLAN, broadcast domain, etc. As described above, a PE device can provide service to thousands of customers by configuring EVCs on a single NNI. Neighboring or remote PE devices can receive the advertising messages and maintain a table, list, matrix, database, etc. that stores B-MAC addresses received from other PE devices. Each PE device can use the table of B-MAC addresses to perform network routing functions.

The remote PE devices can learn the C-MAC addresses using the B-MAC address corresponding to the PE device. For example, the C-MAC address for a device can be encapsulated along with a B-MAC address that corresponds to the NNI port which is connected to the CE device. In one embodiment, the PE device can use a dedicated B-MAC address for advertising C-MAC addresses for CE devices that are single-homed devices. This dedicated B-MAC address can be different than the B-MAC used for single-active multi-homed devices or networks. As discussed above, for single-active multi-homed segments, the PE device can use a shared B-MAC address per PE (e.g. same address for all NNIs) or a B-MAC address per interface (e.g. different address for each NNI).

At step 506, the PE device detects a failure affecting one or more of its service instances. The failure can occur anywhere in the link between the PE device and the CE device. For example, the failure can be within the attachment circuit, e.g. a router, switch, or other device within the access network. The PE device can utilize fault management and performance monitoring protocols to detect the failure. In one embodiment, ethernet operations administration and maintenance (EOAM) can be used by the PE device to detect the failure. A failure can also include a failure that occurs locally at the PE device itself. For example, the PE device can detect a loss of light at one of its ports, such as an NNI failure.

After the PE device detects a failure, the method can continue to step 508 to identify at least one service instance affected by the failure. For example, if the PE detects a failure of a single EVC on an NNI, the PE can determine the CE device that is associated with the failed EVC. The PE can determine what customer the CE device corresponds to, one or more VLANs associated with the CE device, the broadcast domain, etc. The PE can further determine if the CE device is a single-homed device or a single-active multi-homed device.

If the identified CE device associated with the service instance is a single-active multi-homed device, then the PE device can determine that the corresponding C-MAC address should be flushed. The method then continues to step 510 where the PE device sends a flush notification message to remote or neighboring PE devices that identifies the affected service instance and a B-MAC address. The PE re-advertises the B-MAC address associated with the NNI of the failed attachment circuit via BGP using EVPN MAC advertisement route with MAC Mobility extended community. The advertisement can include a field or attribute that identifies an I-SID or a range of I-SIDs that are affected by the failure.

In one example, the message sent to neighboring PE devices can be a BGP extended community message having fields and a structure as depicted in FIG. 6. For example, the message can include a type 602 field that can be one byte in length. In one example, the type 602 field can have a value of 0x06 corresponding to a type of EVPN. The message can also have a sub-type 604 field that can also be one byte in length. The message can have a Base I-SID 606 field that includes the instance service identifier (I-SID) for the affected service instance with the lowest or base I-SID. The Base I-SID 606 field can have a length of 24 bits. The message can also have a Bit Map 608 field that can be used to identify additional service instances that are affected by the failure and can have a length that is also 24 bits. For example, if VLANs 50-60 are affected by the failure, then the Base I-SID 606 can correspond to the I-SID for VLAN 50 and the Bit Map 608 field can have a value of 0x00A, which indicates that the next 10 I-SIDs (e.g. VLAN 51-60) are also affected. Those that are skilled in the art will recognize that the message in FIG. 6 can be modified to add or remove fields and to change lengths of the respective fields without affecting the implementation of the present technology.

Returning to FIG. 5, the message sent at step 510 can be sent utilizing BGP route advertisment. Upon receipt of the flush notification message, remote PEs can determine that C-MAC addresses learned via the re-advertised B-MAC address should be flushed. In addition, the remote PEs can also identify the service instance that is affected by the failure and constrain the flushing to C-MAC addresses corresponding to the service instance.

As discussed above, in some instances the PE device can identify failures affecting more than one service instance. In the event the affected service instances have consecutive I-SIDs, a single message can be used to identify all of the affected service instances by using the base I-SID (e.g. the lowest I-SID) and a second field that identifies the number of affected service instances. Alternatively, if the affected service instances do not have consecutive I-SIDs, the PE device can send individual messages to the remote PE devices identifying each of the affected service instances.

After the message is sent at 510, the method continues to step 512 where it returns to previous processing, which includes repeating method 500.

FIG. 7 illustrates a second example method 700 for performing customer MAC address flushing upon detecting a failure in PBB-EVPN. The method 700 begins at step 702 and proceeds to step 704 where a PE device receives a flush notification message from a neighboring PE identifying at least one service instance that requires C-MAC flushing.

The message received by the PE device can be a message such as the one discussed with respect to FIG. 6. That is, the message can include an instance service identifier (I-SID) for the service instance that is affected by a failure detected by the sending PE device. The message can also identify a series of affected service instances by utilizing a second field that indicates the number of service instances above a base I-SID which are affected. The message can also identify a backbone MAC (B-MAC) address corresponding to the PE device. For example, the identified B-MAC can correspond to an NNI on the sending PE device that is associated with a failed EVC serving the identified I-SID. Alternatively, the B-MAC may correspond to a shared B-MAC for all single-active multi-homed CE devices associated with the sending PE device. In another embodiment, the message can consist of a B-MAC without any I-SID. In this instance, the receiving PE device can determine, based on the lack of an identified I-SID, that it needs to flush all I-SIDs for the identified B-MAC.

After the message is received, the method continues to step 706 where the PE device identifies at least one C-MAC address corresponding to the service instance (I-SID) included in the message. That is, based on the B-MAC and the I-SID, the receiving PE device can identify one or more corresponding C-MAC addresses. With reference to FIG. 3, if the B-MAC corresponds to NNI 306*a* on PE2 306 (B-M2*a*) and the I-SID is associated with CE 4 (I-SID=1), the receiving PE device can identify the C-MAC addresses associated with CE4 which include C-M4*a* to C-M4*n*.

If the received message identifies more than one I-SID, the PE device can identify C-MAC addresses for each identified I-SID. In some instances, the identified service instance can also be associated with a CE device that is coupled to the receiving PE device. However, the receiving PE device can avoid identifying C-MAC addresses associated with its own CE device by using the B-MAC address to filter the C-MAC addresses that need to be flushed.

After the PE device identifies one or more C-MAC addresses that need to be flushed, the method continues to step 708 where it flushes (removes) the identified C-MAC addresses from a local MAC filtering database. After removing these C-MAC addresses from the filtering database, the PE device can temporarily flood traffic that is destined for the affected C-MAC address until it re-learns the proper B-MAC for the affected C-MAC via the data plane. Furthermore, a designated forwarder election process can be initiated to determine which PE device should become the designated forwarder for the affected CE device, which is a single-active multi-homed device.

After the C-MAC addresses are removed at 708, the method continues to step 710 where the PE device resumes previous processing, which includes repeating method 700.

Example Devices

FIG. 8 illustrates an example network device 810 suitable for high availability and failover. Network device 810 includes a master central processing unit (CPU) 862, interfaces 868, and a bus 815 (e.g., a PCI bus). When acting under the control of appropriate software or firmware, the CPU 862 is responsible for executing packet management, error detection, and/or routing or forwarding functions. The CPU 862 can accomplish all these functions under the control of software including an operating system and any appropriate applications software. CPU 862 may include one or more processors 863 such as a processor from the Motorola family of microprocessors or the MIPS family of microprocessors. In an alternative embodiment, processor 863 is specially designed hardware for controlling the operations of network device 510. In a specific embodiment, a memory 561 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the network device 810. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 861) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 9A and FIG. 9B illustrate example system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 970 and random access memory (RAM) 975, to the processor 910. The system 900 can include a cache of high-speed memory connected directly with, in close proximity to, or integrated as part of the processor 910. The system 900 can copy data from the memory 915 and/or the storage device 930 to the cache 917 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 937, module 7 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 975, read only memory (ROM) 970, and hybrids thereof.

The storage device 930 can include software modules 937, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates an example computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
   maintaining, at a first provider edge (PE) device, a plurality of service instances configured on a first interface;
   detecting, at the first PE device, at least one failed ethernet virtual circuit (EVC) on the first interface;
   identifying, from the plurality of service instances, at least one service instance that is associated with the at least one failed EVC, wherein the at least one service instance is associated with a plurality of customer edge devices with at least one customer media access control (C-MAC) address; and
   sending, to a second PE device, a C-MAC flush notification message that identifies the at least one service instance, wherein the flush notification message causes the second PE device to remove the at least one C-MAC address belonging to the plurality of customer edge devices associated with the at least one service instance.

2. The method of claim 1, further comprising:
   determining that the at least one service instance corresponds to a single-active multi-homed device or a single-active multi-homed network.

3. The method of claim 1, wherein the message is a border gateway protocol (BGP) extended community message that identifies the at least one service instance.

4. The method of claim 1, wherein the flush notification message comprises a backbone MAC (B-MAC) address that is shared for all single-active multi-homed segments associated with the first PE device.

5. The method of claim 1, wherein the flush notification message comprises a backbone MAC (B-MAC) address that is shared for all single-active multi-homed segments associated with the first interface, wherein the first interface is a network to network interface (NNI).

6. The method of claim 1, wherein the at least one service instance corresponds to a virtual local area network (VLAN) configured on both the first PE device and the second PE device.

7. The method of claim 1, further comprising:
   detecting, at the first PE device, a plurality of failed ethernet virtual circuits corresponding to a portion of the plurality of service instances, wherein the message identifies the portion of the plurality of service instances.

8. The method of claim 7, further comprising:
   determining that a first service instance from the portion of the plurality of service instances corresponds to a single-homed device or a multi-homed all-active device; and in response, excluding the first service instance from the C-MAC flush notification message that identifies the portion of the plurality of service instances.

9. A provider edge (PE) device comprising:
a processor; and
a computer-readable storage medium having stored therein instructions which, when executed by the processor, cause the processor to perform operations comprising:
   receive, from a neighboring PE device, a first message that includes at least one service instance identifier and a port identifier, wherein the at least one service instance is associated with a plurality of customer edge (CE) devices with at least one customer media access control (C-MAC) address;
   identify, based on the at least one service instance identifier and the port identifier, the at least one C-MAC address corresponding to the plurality of CE devices; and
   remove the at least one C-MAC address from a local MAC filtering database.

10. The device of claim 9, wherein the port identifier is a backbone media access control (B-MAC) address of a network to network interface (NNI) on the neighboring PE device.

11. The device of claim 9, wherein the first message is a border gateway protocol (BGP) extended community message that includes the at least one service instance identifier.

12. The device of claim 9, wherein the CE device is multi-homed to the PE device and the neighboring PE device.

13. The device of claim 9, wherein the first message comprises a B-MAC address that is shared for all single-active multi-homed segments associated with the neighboring PE device.

14. The device of claim 9, the computer-readable storage medium having stored additional instructions which cause the processor to:
   receive a second message that includes a plurality of service instance identifiers and a port identifier;
   remove from the local MAC filtering database a plurality of C-MAC addresses associated with each of the plurality of service instance identifiers.

15. A non-transitory computer-readable storage medium having stored therein instructions which, when executed by a processor, cause the processor to perform operations comprising:
   maintaining, at a first provider edge (PE) device, a plurality of service instances configured on a first interface;
   detecting, at the first PE device, at least one failed attachment circuit on the first interface;
   identifying, from the plurality of service instances, at least one service instance that is associated with the at least one failed attachment circuit wherein the at least one service instance is associated with a plurality of customer edge devices with at least one customer media access control (C-MAC) address; and
   in response to determining that the at least one service instance corresponds to a single-active multi-homed device or a single-active multi-homed network, sending a CMAC flush notification message to a remote PE device that identifies the at least one failed service instance, wherein the flush notification message causes the remote PE device to remove the at least one C-MAC address belonging to the plurality of customer edge devices associated with the at least one service instance.

16. The non-transitory computer-readable storage medium of claim 15, storing additional instructions which, when executed by the processor, result in operations comprising:
   in response to determining that the at least one failed service instance corresponds to a single-homed device or multi-homed all-active device, determining that a C-MAC flush notification message should not be sent to the remote PE device.

17. The non-transitory computer-readable storage medium of claim 15, wherein the message is a border gateway protocol (BGP) extended community message.

18. The non-transitory computer-readable storage medium of claim 15, wherein detecting the at least one failed attachment circuit comprises using ethernet operations administration and maintenance (EOAM).

19. The non-transitory computer-readable storage medium of claim 15, wherein the message comprises a B-MAC address for the first interface.

20. The non-transitory computer-readable storage medium of claim 19, wherein the CMAC flush notification message causes the remote PE device to remove a C-MAC address corresponding to the at least one service instance and the B-MAC address for the first interface.

* * * * *